(12) United States Patent
Roach et al.

(10) Patent No.: US 10,851,714 B2
(45) Date of Patent: Dec. 1, 2020

(54) ENGINE ACCESSORY DRIVES SYSTEMS AND METHODS

(71) Applicant: The Boeing Company, Chicago, IL (US)

(72) Inventors: Jeffrey M. Roach, Saint Charles, MO (US); Michael T. Fox, Saint Charles, MO (US); Howard Carter, III, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/398,092

(22) Filed: Apr. 29, 2019

(65) Prior Publication Data

US 2019/0257249 A1    Aug. 22, 2019

Related U.S. Application Data

(63) Continuation of application No. 15/055,486, filed on Feb. 26, 2016, now Pat. No. 10,273,883.

(51) Int. Cl.
| | |
|---|---|
| *F02C 7/32* | (2006.01) |
| *F02C 7/36* | (2006.01) |
| *F01D 15/08* | (2006.01) |
| *F01D 15/10* | (2006.01) |
| *F01D 15/12* | (2006.01) |
| *F02C 7/268* | (2006.01) |
| *F02K 3/06* | (2006.01) |

(52) U.S. Cl.
CPC ............... *F02C 7/32* (2013.01); *F01D 15/08* (2013.01); *F01D 15/10* (2013.01); *F01D 15/12* (2013.01); *F02C 7/268* (2013.01); *F02C 7/36* (2013.01); *F02K 3/06* (2013.01); *F05D 2220/323* (2013.01); *F05D 2260/40311* (2013.01)

(58) Field of Classification Search
CPC .... F02C 7/32; F02C 7/36; F02C 7/268; F01D 15/08; F01D 15/10; F01D 15/12; F02K 3/06; F05D 2220/323; F05D 2260/40311
See application file for complete search history.

(56) References Cited

U.S. PATENT DOCUMENTS

| | | | |
|---|---|---|---|
| 2,857,739 | A | 10/1958 | Wright |
| 2,951,631 | A | 9/1960 | Gregory |
| 3,274,768 | A | 9/1966 | Klein |
| 3,680,309 | A | 8/1972 | Wallace, Jr. |
| 3,830,056 | A | 8/1974 | Willis, Jr. et al. |
| 4,251,987 | A | 2/1981 | Adamson |
| 4,315,403 | A | 2/1982 | Girard et al. |
| 4,640,153 | A | 2/1987 | Brogdon et al. |
| 4,651,521 | A | 3/1987 | Ossi |

(Continued)

FOREIGN PATENT DOCUMENTS

| | | |
|---|---|---|
| EP | 1731735 | 12/2006 |
| EP | 1936238 | 6/2008 |

*Primary Examiner* — Barry Gooden, Jr.
(74) *Attorney, Agent, or Firm* — Haynes and Boone, LLP (57) ABSTRACT

An accessory drive for an engine includes a power takeoff (PTO) configured to couple power from a rotating shaft of the engine and to convey the power through an opening in a housing of the engine. A gearbox is coupled to and configured to be driven by the PTO. The gearbox is disposed external to the housing and includes a planetary gear train. At least one engine accessory is coupled to and configured to be driven by the planetary gear train.

20 Claims, 4 Drawing Sheets

(56) References Cited

U.S. PATENT DOCUMENTS

| | | |
|---|---|---|
| 4,765,135 A | 8/1988 | Lardellier |
| 4,779,413 A | 10/1988 | Mouton |
| 4,878,401 A | 11/1989 | Chung |
| 5,125,597 A * | 6/1992 | Coffinberry ............. B64C 21/00 244/118.5 |
| 5,141,182 A | 8/1992 | Coffinberry |
| 5,694,765 A | 12/1997 | Hield et al. |
| 6,840,479 B1 | 1/2005 | Przygoda et al. |
| 6,966,865 B2 | 11/2005 | Drago et al. |
| 7,334,560 B2 | 2/2008 | Clark |
| 7,481,062 B2 | 1/2009 | Gaines et al. |
| 7,500,365 B2 | 3/2009 | Suciu et al. |
| 7,507,180 B2 | 3/2009 | Robuck |
| 7,547,264 B2 | 6/2009 | Usoro |
| 7,582,034 B2 | 9/2009 | Usoro |
| 7,997,085 B2 | 8/2011 | Moniz et al. |
| 8,328,673 B2 | 12/2012 | Smith et al. |
| 8,770,327 B2 | 7/2014 | Yamada et al. |
| 8,814,502 B2 | 8/2014 | Eleftheriou |
| 8,973,465 B2 | 3/2015 | Duong |
| 9,212,607 B2 | 12/2015 | West |
| 2005/0188704 A1 | 9/2005 | Butt |
| 2006/0010875 A1 | 1/2006 | Mahoney et al. |
| 2006/0272313 A1 | 12/2006 | Eick et al. |
| 2007/0151258 A1 | 7/2007 | Gaines et al. |
| 2007/0173365 A1 * | 7/2007 | Linet ....................... F02C 3/107 475/83 |
| 2008/0006023 A1 | 1/2008 | Lardellier |
| 2009/0111639 A1 | 4/2009 | Klingels |
| 2009/0139243 A1 * | 6/2009 | Winter ...................... F02C 7/32 60/802 |
| 2010/0167863 A1 | 7/2010 | Lemmers, Jr. |
| 2011/0314963 A1 * | 12/2011 | Poisson ................... F02C 7/36 74/665 F |
| 2012/0011839 A1 | 1/2012 | Kandil et al. |
| 2013/0260950 A1 | 10/2013 | Lemmers, Jr. |
| 2014/0021292 A1 | 1/2014 | West |
| 2015/0192075 A1 | 7/2015 | Griffiths |
| 2016/0076393 A1 | 3/2016 | Sheridan |
| 2016/0146244 A1 | 5/2016 | Campbell et al. |
| 2017/0341651 A1 | 11/2017 | Monajemi et al. |
| 2018/0043772 A1 | 2/2018 | Janson et al. |
| 2018/0230902 A1 | 8/2018 | Desjardins |

* cited by examiner

ENGINE ACCESSORY DRIVES SYSTEMS AND METHODS

CROSS-REFERENCE TO RELATED APPLICATIONS

This application is a continuation of U.S. patent application Ser. No. 15/055,486 filed Feb. 26, 2016 and entitled "ENGINE ACCESSORY DRIVES SYSTEMS AND METHODS" (to issue as U.S. Pat. No. 10,273,883 on Apr. 30, 2019), the contents of which are incorporated herein by reference in its entirety.

BACKGROUND

1. Technical Field

This disclosure relates to gas turbine engines in general, and in particular, to an accessory drive for such engines.

2. Related Art

Engines, such as jet turbine engines of a type used, for example, to propel commercial or military aircraft, require a number of engine accessories, such as electrical generators, oil and fuel pumps, hydraulic and coolant pumps and the like, in order to function. To operate these essential accessories, some of the power generated by the engine is taken off of the engine and coupled through an "accessory drive," or "gearbox," that is used to drive the accessories. The accessories, along with the gearbox, are typically coupled closely to the outer surface of the engine's housing, and within the engine's nacelle, if any, to minimize the space they occupy, e.g., for streamlining purposes.

Engines typically include one or more rotating shafts from which "secondary power" can be coupled to drive the engine's accessories through the gearbox. However, existing engine accessory gearboxes, which typically incorporate one or more trains of spur gears, entail a fixed relative speed between the engine and the accessories without the possibility of stopping or changing the relative speeds or loads of the accessories. This can result in gear backlash between the engine and the accessories when they are respectively sped up, slowed down, stopped, or operated intermittently, with concomitant shaft vibration and torsional resonance.

SUMMARY

In accordance with this disclosure, one or more novel embodiments of engine accessory drives are provided for example that may substantially confine backlash in the drives to backlash between the shaft(s) of the engines and their respective gearboxes, and that may substantially eliminate backlash between the engine shaft(s) and each accessory. As an example, the accessories may not be affected by shaft vibration and torsional resonance and no or very little power may be lost due to rotating accessories that are not producing any output power.

In one example embodiment, an accessory drive for an engine comprises a power takeoff (PTO) configured to couple power from a rotating shaft of the engine and to convey the power through an opening in a housing of the engine. A gearbox is coupled to and configured to be driven by the PTO. The gearbox is disposed external to the housing and includes a planetary gear train. At least one engine accessory is coupled to and configured to be driven by the planetary gear train.

In another example embodiment, a method for driving at least one accessory of an engine comprises receiving power from a rotating shaft of the engine and conveying it through an opening of a housing of the engine with a power takeoff (PTO), driving a gearbox with the PTO, the gearbox being disposed external to the housing and including a planetary gear train, and driving the at least one engine accessory with the planetary gear train.

In yet another example embodiment, a method for driving a plurality of engine accessories, each of which is operable at a different speed and/or load than the speed and/or load of the other engine accessories, comprises driving the accessories with a planetary gearbox such that gear backlash between the engine and the accessories is substantially confined to backlash between the engine and the gearbox and substantially eliminated between the gearbox and the engine accessories.

The scope of the invention is defined by the appended claims, which are incorporated here by reference. A better understanding of the novel accessory drives of the present disclosure, as well as an appreciation of the above and additional advantages thereof, will be afforded to those of some skill in the art by a consideration of the following detailed description of one or more example embodiments thereof. In this description, reference is made to the various views of the appended sheets of drawings, which are briefly described below, and within which like reference numerals are used to identify like ones of the elements illustrated therein.

DETAILED DESCRIPTION

An engine, such as an aircraft gas turbine engine, typically includes a compressor, a combustor a turbine, and one or more rotating shafts that connect the turbine to the compressor and couple power between the two. The rotating shafting can include, for example, a low pressure (LP) shaft and a high pressure (HP) shaft, and in some embodiments, the two shafts can be coupled together to comprise a common shaft. The present disclosure contemplates the use of two separate engine "spools," viz., an HP or compressor shaft having a plurality of compressor blades affixed to and extending radially outward from it, and an LP or turbine spool, i.e., a turbine shaft having a plurality of turbine blades affixed to and extending radially outward from it. Each of the two spools rotates within a corresponding one of the compressor, which comprises a chamber incorporating a plurality of fixed compressor blades extending radially inward within it, and the turbine, which comprises a chamber incorporating a plurality of fixed turbine blades extending radially inward within it.

In a typical axial-flow gas turbine engine for an aircraft, the engine typically supplies power for various systems and accessories essential to the engine and/or aircraft operation, as well as passenger comfort, besides producing a propulsive thrust that can include a combination of a "bypass" air stream and a turbojet exhaust thrust. One way to power these systems and accessories is to couple power from the LP shaft, the HP shaft, or a common shaft, typically located along a central longitudinal axis of the engine, with a transfer, or power takeoff (PTO) shaft. This shaft, which can comprise a "tower shaft" and/or an "angle shaft," transmits the power to a gearbox, which, in some embodiments, can be mounted beneath the engine. In particular, the tower shaft can engage either the HP shaft or the LP shaft through a bevel gear set and transfer power from the shaft to the gearbox through another bevel gear set disposed adjacent to or within the gearbox.

The engine accessories can include, for example, at least one of a starter, an electrical generator, a fuel pump, a hydraulic pump, a scavenger pump, a de-oiler, or the like. As contemplated herein, the accessories can be driven at the same or substantially different speeds by means of a planetary gear train that is driven by a common transfer or PTO shaft. As also contemplated in the present disclosure, the planetary gearbox can include more gearing and/or additional shafts other than those discussed herein. Additionally, the gears themselves can comprise a wide variety of gears types, such as spur, crown, helical, hypoid, spiral gears, or the like.

In some embodiments, a brake and clutch can be used to selectively couple the PTO shaft to the LP shaft, the HP shaft, or the common shaft, and in a preferred embodiment, to the LP shaft for constant rotation. The gearbox, which can be located between the front and rear ends of the engine, transfers power from the selected engine shaft and also functions as a speed reduction unit.

The power taken off of the engine's LP, HP or common shaft (i.e., the secondary power) is used to power the accessories, which are coupled to the shaft through the gearbox (e.g. electric generator, hydraulic pumps, starters, and the like), and which can entail power, weight, maintenance, and safety demands, and can constitute a significant fuel penalty on the engine. The magnitude of these effects depends on the amount of power extracted, the operating conditions of the engine, the type of power extracted, and the point of power extraction within the engine.

Existing engine accessory gearboxes have a fixed relative speed between the accessories without the possibility of stopping or changing relative speeds of the accessories without producing backlash in the gears and attendant shaft vibration and torsional residue. However, by using a gearbox with a planetary gear arrangement, the gear backlash is substantially confined to backlash between the engine's LP, HP or common shaft and the planetary gearbox, and substantially reduced between the accessories themselves and/or the gearbox, so that relatively tight coupling of the accessories can aid in the control of shaft vibration and torsional residue.

For example, the fixed torsional mode frequency between accessories due to the constant relative speed of a traditional gearbox, and that of the non-constant relative speed of the accessories of the current disclosure, provides an advantageous opportunity to change the resonant mode frequency between the accessories of the present disclosure to other frequencies through a selective control method. For example, controlling the displacement of a variable displacement hydraulic pump by controlling the position of its swash plate. Similar control methods can be used with other engine accessories. Thus, the engine accessories of the present disclosure can start, stop, speed up or down, and/or operate at a continuous speed, all at the same time, while controlling the torsional mode frequencies of the accessories. This can result in a gas turbine engine with improved efficiency and reduced secondary power usage, which in turn, can result in a decrease in the fuel penalty due to the extraction of the secondary power from the engine shaft(s).

Figure 1:
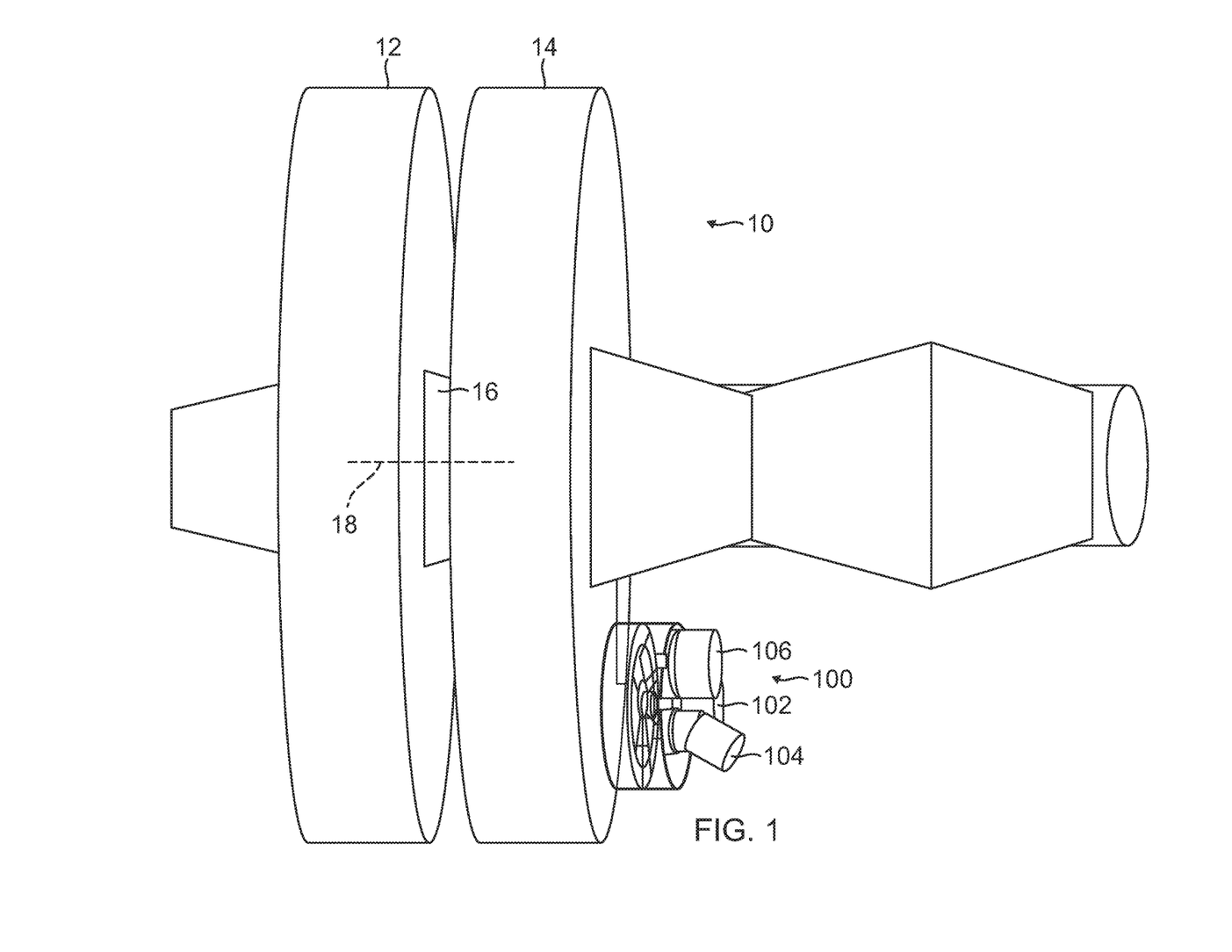
FIG. 1 is a stylized left side perspective view of a gas turbine engine incorporating an example embodiment of an engine accessory drive in accordance with the present disclosure, showing a plurality of engine accessories being driven by the accessory drive.
Figure 2:
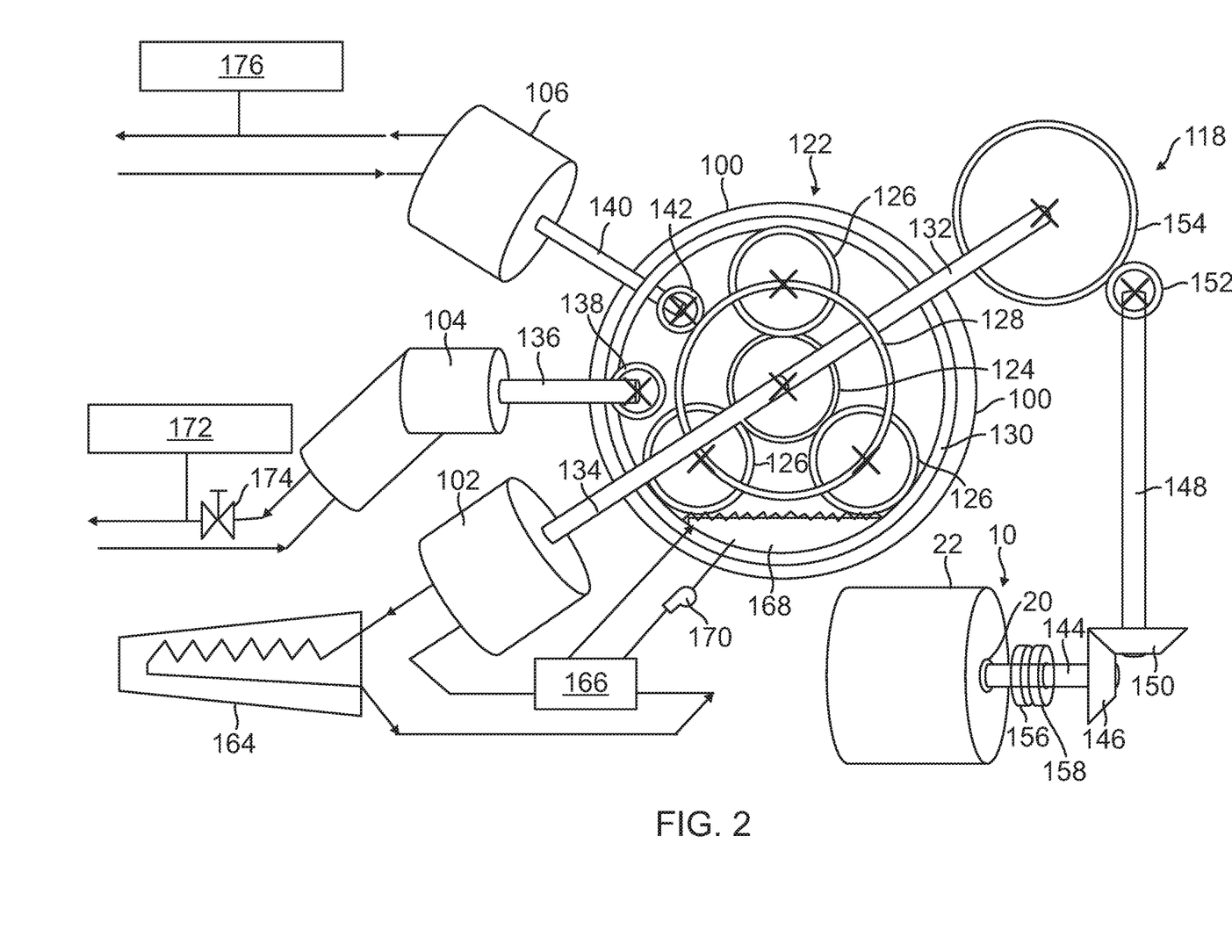
FIG. 2 is a stylized front end perspective view of the example engine accessory drive of FIG. 1.
Figure 3A:
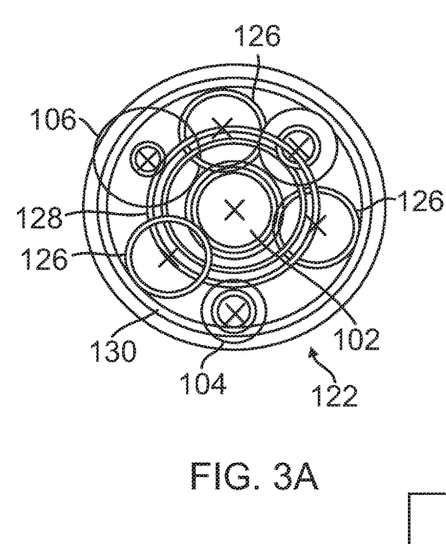
FIGS. 3A and 3B are stylized front and side elevation views, respectively, of the accessory drive and engine accessories of FIG. 1.
Figure 3B:
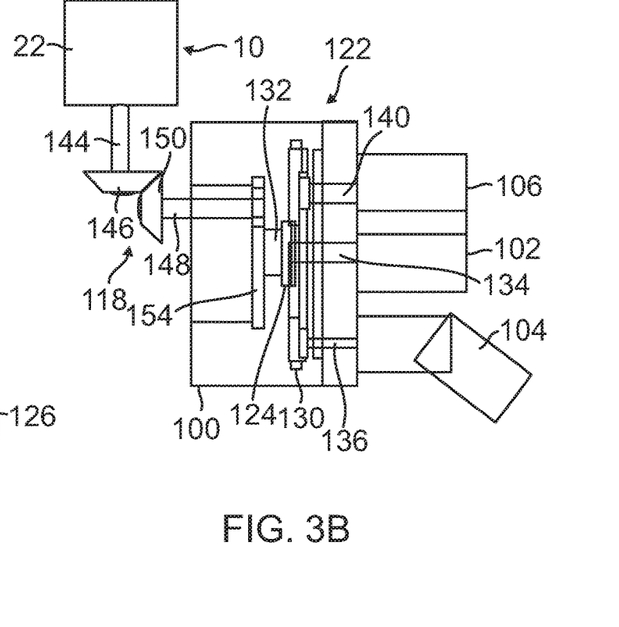

FIG. 1 is a stylized left side perspective view of a gas turbine engine 10 incorporating an example embodiment of an engine accessory drive 100 in accordance with the present disclosure, showing a plurality of engine accessories 102, 104 and 106 being driven by the accessory drive 100, and FIG. 2 is a stylized front end perspective view of the example accessory drive 100 of FIG. 1. FIGS. 3A and 3B are stylized front and side elevation views, respectively, of the accessory drive 100 and engine accessories 102, 104 and 106 of FIG. 1.

As discussed above, the engine 10 can comprise, for example, a turbojet engine or turbofan engine, and as illustrated in FIG. 1-FIG. 3B, the example engine 10 can comprise an upstream compressor section 12 coupled to a downstream turbine section 14, and a combustion chamber 16 disposed between the compressor and turbine sections 12 and 16. As discussed above, the rotating shafting of the engine 10 can comprise a low pressure (LP) shaft and a high pressure (HP) shaft, and in the particular embodiment illustrated, comprises an axially extending common shaft 18 (shown as a dashed line in FIG. 1) that couples the compressor section 12 to the turbine section 14 through the combustion chamber 16.

In the particular example embodiment illustrated, the engine accessories comprise a compressor 102, a pump 104, and an electrical motor/generator 106, but as discussed above, the type and number of the accessories driven by the accessory drive 100 can vary, depending on the particular application at hand. For example, the motor/generator 106 could alternatively or additionally comprise an engine starter, and the pump could alternatively or additionally comprise one or more of a fuel pump, a hydraulic pump, and/or an oil pump.

As illustrated in FIG. 1-FIG. 3B, the example engine accessory drive 100 comprises a power takeoff (PTO) 118 that is configured to couple power, i.e., secondary power, from the rotating common shaft 18 of the engine 10, and to convey the power through, for example, an opening 20 in a housing 22 of the engine 10, and a gearbox 120 that is coupled to and configured to be driven by the PTO 118. In the embodiment shown, the gearbox 120 is disposed external to a housing 22 of the engine 10, and of importance, includes a planetary (also known as an epicyclical or hypocycloidal) gear train 122, described in more detail below. As also described in more detail below, the engine accessories 102, 104 and 106 are coupled to and configured to be driven by the planetary gear train 122.

In the particular example embodiment of FIG. 1-FIG. 3B, the planetary gear train 122 comprises a sun gear 124, three planet gears 126 disposed on a planet carrier 128 and in driving engagement with the sun gear 124, and a ring gear 130 disposed in driving engagement with the planet gears 126, and is configured such that the planetary gears 126 are fixed against rotation with respect to the planet carrier 128, such that rotation of the sun gear 124, which is driven by a drive shaft 132 of the PTO 118, causes conjoint rotation of the planet gears 126, the planet carrier 128 and the ring gear 130, that is, the sun gear 124, the planet carrier 128 and the ring gear 130 all rotate at the same direction and at the same speed.

The engine accessory 102 is driven by the sun gear 124 through a drive shaft 134 that is coupled directly to and disposed coaxial with the shaft 132 that drives the sun gear 124. The engine accessory 104 is coupled to and driven by a shaft 136 having a gear 138 at its input end that is disposed in engagement with the ring gear 130, and the engine accessory 106 is coupled to and driven by a shaft 140 having a gear 142 at its input end that is disposed in engagement with the planet carrier 142. Of course, other gearing and coupling arrangements in the planetary gear drive 122 are possible and easily implemented. For example, the planet gears 126 can be allowed to rotate relative to the planet carrier 126 and revolve about the sun gear 124, the ring gear 130 can be fixed, and the engine accessories 104 and 106 can be driven by the planet carrier 126. Alternatively, the planet carrier 126 can be fixed, the ring gear 130 allowed to rotate, and the engine accessories 104 and 106 can be driven by the ring gear 130.

As illustrated in FIGS. 2 and 3B, the PTO 118 can comprise a so-called "tower shaft" 144 having an input end with, e.g., a first bevel gear disposed thereon, and an output end having a second bevel gear 146 disposed thereon. The bevel gear at the input end of the tower shaft 144 can, in turn, be coupled to and driven by another bevel gear disposed inside the housing 22 and concentrically upon the common shaft 18 of the engine 10. Thus, by varying the angle of these two "internal" bevel gears, the tower shaft 144 can be made to intersect the rotating common shaft 18 of the engine 10 at an angle that can varied from about 0 to about 90 degrees, that is, in a direction that can be varied between a direction substantially perpendicular to the common axis 18 of the engine 10, to a direction substantially parallel to the common axis 18.

As illustrated in FIGS. 2 and 3B, in some embodiments, the PTO 118 can further comprise an "angle shaft" 148 having another bevel gear 150 disposed on an input end thereof and in driving engagement with the bevel gear 146 disposed on the output end of the tower shaft 144, and between an output end of the tower shaft 144 and an input end of the planetary gear train 122. Further, as illustrated in, e.g., FIG. 2, another bevel gear 152 on the output end of the angle shaft 148 can be disposed in driving engagement with a bevel gear 154 disposed on the input end of the sun gear 124 drive shaft 132. As above, the respective angles of the bevel gears 146, 150, 152 and 154 can facilitate a wide range of mounting positions between the tower shaft 144 and the angle drive 148, and hence, between the engine 10 and the planetary gear accessory drive 100.

As discussed above and illustrated in FIG. 2, a brake 156 and/or a clutch 158 can be disposed between the tower shaft 144 and the common shaft 18 of the engine 10 and used to selectively couple or decouple the secondary power from the common shaft 18 and/or to slow or stop the planetary gear train 122.

Figure 4:
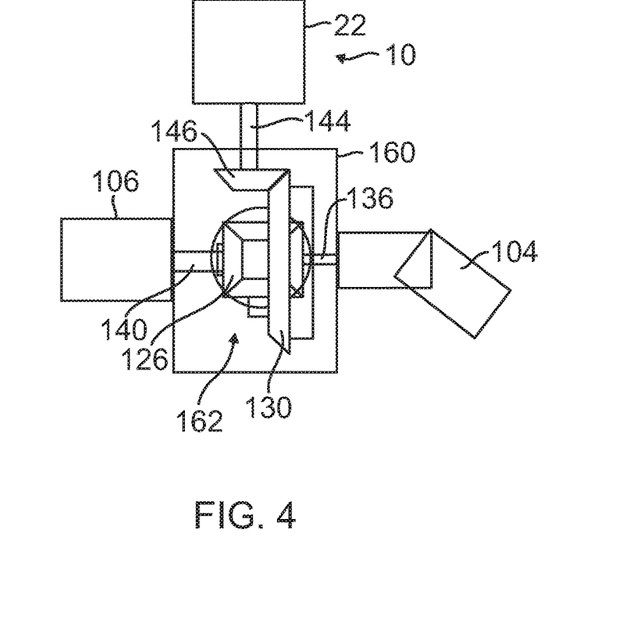
FIG. 4 is a stylized side elevation view of an alternative embodiment of an engine accessory drive incorporating a differential-type of planetary gear train.
Figure 5:
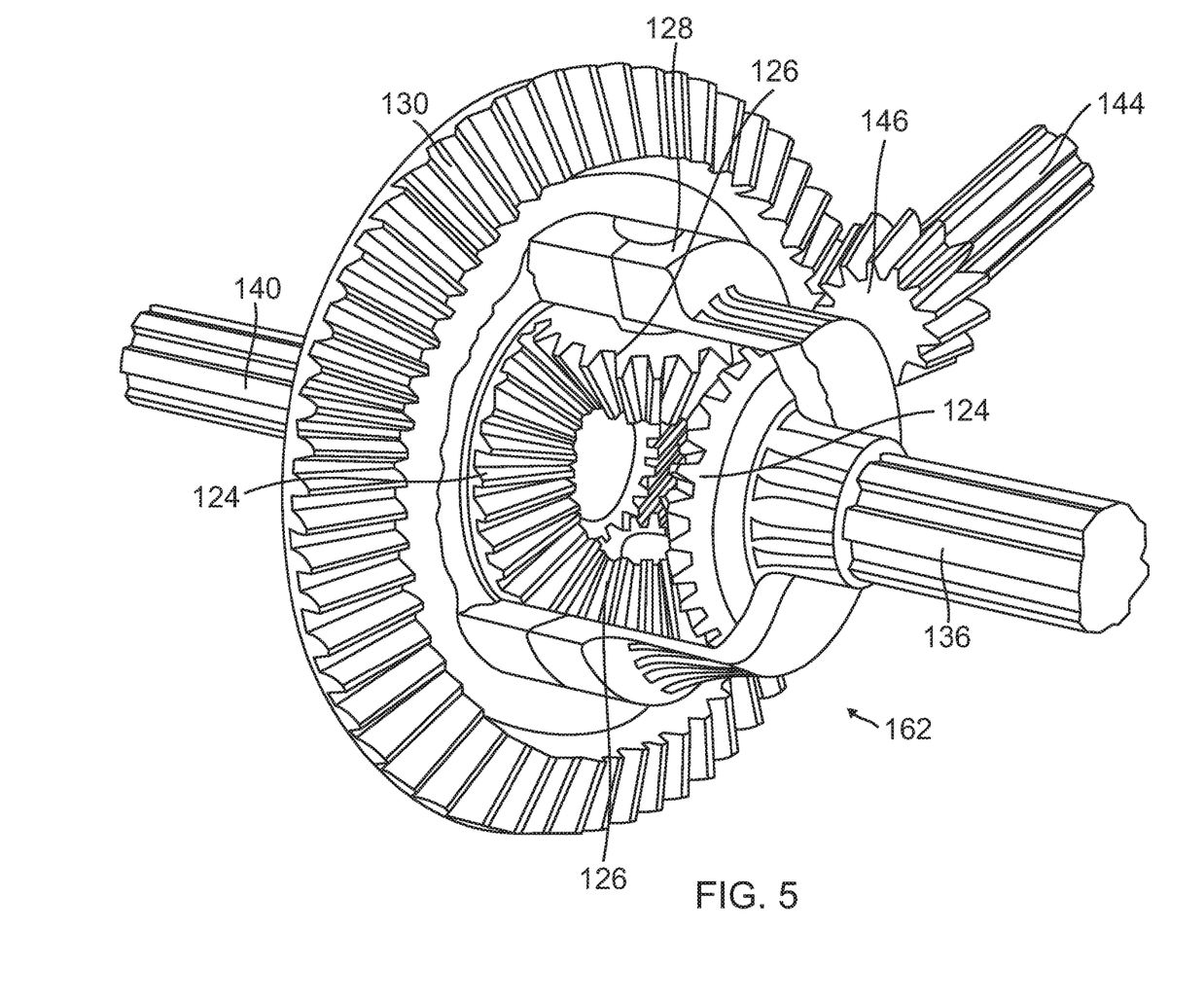
FIG. 5 is a partial cutaway perspective view of a differential-type planetary gear train.

FIG. 4 is a stylized side elevation view of an alternative embodiment of an engine accessory drive 160 incorporating a differential-type of planetary gear train 162, and FIG. 5 is a partial cutaway perspective view of the differential-type planetary gear train 162. The planetary gear train 162 illustrated in FIGS. 4 and 5 is similar in nature to the planetary gear train 122 of FIGS. 2 and 3B, but different in several respects, including that the latter uses bevel gears throughout, incorporates two sun gears 124, and is limited to driving only two engine accessories, e.g., accessories 104 and 106, as illustrated in FIG. 4.

As illustrated in FIGS. 4 and 5, in the differential planetary gear train 162, the bevel gear 146 at the output end of the tower shaft 144 drives the bevel gear ring gear 130 rotationally. The planet carrier 128 is fixed to the ring gear 130 for conjoint rotation therewith. The two bevel planet gears 126 are coupled to the planet carrier 128 for both rotation about their respective centers relative planetary carrier 128, and for conjoint rotation with the planetary carrier 128. The two bevel sun gears 124 are disposed in spaced opposition to each other and in engagement with both of the planet gears 126. Each of the sun gears 124 is respectively coupled to one of the engine accessories 104 and 106 through a corresponding one of their drive shafts 136 and 140.

The differential planetary gear drive 126 has, among others, the following properties. An input torque applied to the ring gear 130 by the tower shaft 144 causes both the ring gear 130 and the planet carrier 128 to rotate conjointly, thereby causing the two planet gears 126 to rotate conjointly with the planet carrier 128, without rotating about their respective centers. Since the planet gears 126 are both disposed in engagement with the two sun gears 124, this causes both sun gears 124, and hence, both engine accessories 104 and 106, to rotate in the same direction and at the same speed as the ring gear 130, the planet carrier 128 and the planet gears 124.

However, if one of the engine accessories, e.g., engine accessory 106, encounters resistance caused by, e.g., an increase in the load of the engine accessory 106, the planet gears 126 will be caused to rotate about their respective centers, as well as rotating conjointly with the planet carrier 128. This enables the engine accessory 106, together with its corresponding driving sun gear 124, to slow down, and results in a corresponding increase in the rotational velocity of the engine accessory 104, together with its corresponding driving sun gear 124, thereby enabling the two accessories 104 and 106 to operate at different rotational speeds.

As discussed above, in some embodiments, the engine accessories 102, 104 and 106 can be configured to operate in advantageous cooperation with related system components. For example, as illustrated in FIG. 2, the compressor 102, which operates at the speed of the sun gear 124, can be used in combination with a pair of closed circuits comprising a wing deicing circuit, in which a fluid heated by compression in the compressor 102, is circulated through an aircraft wing 164 to deice it, and then through a heat exchanger 166, before being returned to the compressor 102. In a second circuit, the passage of the fluid through the heat exchanger 166 functions to cool a lubricating fluid disposed in a sump 168 of the accessory drive 100 and circulated through the heat exchanger 166 by a pump 170 before being returned to the sump 168.

In another example, the pump 104 of FIG. 2 can comprise a hydraulic pump operating at the speed of the ring gear 130 and in conjunction with an accumulator 172 disposed in parallel with the pump 104, and a control valve 174 disposed at the outlet of the pump. When the pump 104 has filled the accumulator 172, e.g., at maximum displacement, the valve 174 at the outlet of the pump 104 can be shut off. Closing the valve 174 causes a maximum torque to be applied to the pump 104, and hence, to the motor/generator 106, described in more detail below. When this condition has been achieved, the pump 104 will stop rotating. When the pump 104 stops rotating, no power will be lost to friction at the pump 104, and a stopped pump can enable engine 10 starting using the generator/motor 106 at a maximum torque and gear ratio.

In yet another example, the motor/generator 106, which is driven at the speed of the planet carrier 128, can be used in conjunction with a battery 176 disposed in parallel with the motor/generator 106. In a manner similar to that discussed above in conjunction with the hydraulic pump 104 and hydraulic accumulator 172, the electric load on the engine 10 can be made more "discrete" (i.e., on or off) using the battery 176 in lieu of or in addition to the motor/generator 106.

Thus, the engine accessory drives of the present disclosure can eliminate the necessity of a fixed relative speed between the accessories by implementing a planetary gear train in the accessory drive gear box, thereby decreasing fuel penalties due to the unnecessary extraction of power from a shaft of the engine. By confining the gear backlash to backlash between the engine shaft and the planetary gearbox and not between each accessory, the accessories are relatively unaffected by shaft vibration and torsional resonance, enabling a relatively tight coupling of the accessories to the engine and reducing platform subsystem power off-take by reducing lost power due to rotating accessories when no accessory output power is required.

The planetary gear train of the accessory drive also enables variable speed of the engine accessories relative to the engine PTO shaft(s). The accessories can all start and stop, either together or independently of each other. One engine accessory, such as a refrigeration unit, can be operated steadily, while the speed of another accessory, such as an electrical power unit, is varied. The compressor of a refrigerator unit can be run at continuous speed to provide a continuous load. A hydraulic accumulator can be charged at optimal power using the engine shaft power, and an associated hydraulic pump can be stopped simultaneously, using a shutoff valve, or simultaneously varied using a swash plate of the pump. Thus, all system hydraulic demands can be served by the accumulator when the hydraulic pump is stopped, and no power will be lost due to unnecessary shaft motion.

A variable electric generator can also be sped up or down advantageously using an associated battery. The operation of the other accessories coupled to the present accessory drive can also be made more efficient by stopping their rotation when no accessory output power is required, thereby reducing lost power due to unnecessary rotation of the accessories.

Indeed, as those of some skill will by now appreciate, and depending on the specific application at hand, many modifications, substitutions and variations can be made in and to the materials, apparatus, configurations and methods of use of the planetary gear train accessory drives of present disclosure without departing from its spirit and scope. In light of this, the scope of the present invention should not be seen as limited to those of the particular embodiments illustrated and described herein, as they are merely by way of some examples thereof, but rather, should be fully commensurate with that of the claims appended hereafter and their functional equivalents.

What is claimed is:

1. An accessory drive for an engine, the accessory drive comprising:
   a power takeoff (PTO) configured to couple to a rotating shaft of the engine;
   a gearbox coupled to the PTO, the gearbox comprising a planetary gear train with a plurality of outputs;
   a first engine accessory;
   a second engine accessory;
   a clutch and a brake disposed between the PTO and the rotating shaft,
   wherein each of the first engine accessory and the second engine accessory is coupled to at least one of the outputs of the gearbox, and wherein the gearbox is configured to vary a first driven speed of the first engine accessory relative to a second driven speed of the second engine accessory in response to a load of at least one of the first engine accessory and/or the second engine accessory.

2. The accessory drive of claim 1, wherein the engine comprises a turbofan engine.

3. The accessory drive of claim 1, wherein the PTO comprises a tower shaft, wherein the tower shaft comprises an input end having at least one of a bevel gear, a crown gear, or a spur gear disposed thereon, and wherein the tower shaft intersects the rotating shaft of the engine at an angle of from about 0 to about 90 degrees and further comprising an angle shaft disposed between an output end of the tower shaft and an input end of the planetary gear train.

4. The accessory drive of claim 1, wherein the planetary gear train comprises a sun gear, a planet gear, a planet carrier, and a ring gear, wherein the first engine accessory is coupled to and driven by the sun gear, and wherein the second engine accessory is coupled to and driven by the planet gear, the planet carrier, or the ring gear.

5. An aircraft comprising the accessory drive of claim 1, the aircraft comprising:
   a fuselage;
   a wing; and
   an aircraft propulsor coupled to the fuselage or the wing, wherein the aircraft propulsor comprises the engine.

6. The accessory drive of claim 1, further comprising:
   a controller communicatively coupled to the first engine accessory and configured to cause the first engine accessory to increase and/or decrease the load to cause the second driven speed to change.

7. The accessory drive of claim 6, wherein the controller is further configured to cause the clutch and/or the brake to change a resonant frequency mode between the first engine accessory and the second engine accessory by operating the clutch and/or the brake.

8. The accessory drive of claim 7, wherein the PTO is configured to be coupled to a plurality of rotating shafts of the engine, and wherein the clutch and/or the brake is configured to selectively couple the gearbox to one of the plurality of rotating shafts.

9. The accessory drive of claim 8, wherein the plurality of rotating shafts comprises a low pressure (LP) shaft and a high pressure (HP) shaft of the engine.

10. The accessory drive of claim 9, wherein the LP shaft comprises a turbine shaft and the HP shaft comprises a compressor shaft.

11. An accessory drive for an engine, the accessory drive comprising:
    a power takeoff (PTO) configured to couple to a rotating shaft of the engine;
    a gearbox coupled to the PTO, the gearbox comprising a planetary gear train with a plurality of outputs;
    a first engine accessory;
    a second engine accessory, wherein each of the first engine accessory and the second engine accessory is coupled to at least one of the outputs of the gearbox, and wherein the gearbox is configured to vary a first driven speed of the first engine accessory relative to a second driven speed of the second engine accessory in response to a load of at least one of the first engine accessory and/or the second engine accessory; and a controller communicatively coupled to the first engine accessory and configured to cause the first engine accessory to increase and/or decrease the load to cause the second driven speed to change, wherein the controller is further configured to cause the first engine accessory to change a resonant frequency mode between the first engine accessory and the second engine accessory by increasing and/or decreasing the load.

12. An accessory drive for an engine, the accessory drive comprising:
   a power takeoff (PTO) configured to couple to a rotating shaft of the engine;
   a gearbox coupled to the PTO, the gearbox comprising a planetary gear train with a plurality of outputs;
   a first engine accessory;
   a second engine accessory, wherein each of the first engine accessory and the second engine accessory is coupled to at least one of the outputs of the gearbox, and wherein the gearbox is configured to vary a first driven speed of the first engine accessory relative to a second driven speed of the second engine accessory in response to a load of at least one of the first engine accessory and/or the second engine accessory,
   wherein the planetary gear train comprises a differential comprising a first sun gear and a second sun gear, wherein the first engine accessory is coupled to and configured to be driven by the first sun gear, and wherein the second engine accessory is coupled to and configured to be driven by the second sun gear.

13. The accessory drive of claim 12, wherein the differential comprises a bevel gear differential, and wherein the first engine accessory comprises an electrical generator, a fuel pump, a hydraulic pump, an oil pump, a compressor, or an engine starter.

14. A method comprising:
   operating an engine to power an accessory drive, wherein the accessory drive comprises:
      a gearbox coupled to a power takeoff of the engine and comprising a planetary gear train with a plurality of outputs;
      a first engine accessory;
      a second engine accessory; and
      a clutch and a brake coupled to the power takeoff,
      wherein each of the first engine accessory and the second engine accessory is coupled to at least one of the outputs, and wherein the gearbox is configured to vary a first driven speed of the first engine accessory relative to a second driven speed of the second engine accessory in response to a load of at least one of the first engine accessory and/or the second engine accessory; and
   causing the first engine accessory to vary the load to cause the second driven speed to change.

15. The method of claim 14, wherein the first accessory comprises a variable displacement pump comprising a swash plate, and wherein the causing the first engine accessory to vary the load comprises varying a position of the swash plate.

16. The method of claim 14, wherein the causing the first engine accessory to vary the load comprises changing an operating speed of the first engine accessory.

17. The method of claim 14, wherein the planetary gear train comprises a sun gear, a planet gear, a planet carrier, and a ring gear, wherein the first engine accessory is coupled to and driven by the sun gear, and wherein the second engine accessory is coupled to and driven by the planet gear, the planet carrier, or the ring gear.

18. The method of claim 14, further comprising:
   operating the clutch and/or the brake to change a resonant frequency mode between the first engine accessory and the second engine accessory.

19. The method of claim 18, further comprising:
   operating the clutch and/or the brake to selectively couple the gearbox to one of a plurality of rotating shafts of the engine.

20. The method of claim 19, wherein the plurality of rotating shafts comprises a low pressure (LP) shaft and a high pressure (HP) shaft of the engine.

* * * * *